United States Patent
Kobayashi et al.

(10) Patent No.: US 6,392,982 B1
(45) Date of Patent: May 21, 2002

(54) CORNER PART REINFORCING DEVICE OF DISC DEVICE CHASSIS

(75) Inventors: Masaki Kobayashi, Hyogo; Takao Morimoto, Tokyo, both of (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/554,497

(22) PCT Filed: Sep. 29, 1998

(86) PCT No.: PCT/JP98/04383

§ 371 Date: May 16, 2000

§ 102(e) Date: May 16, 2000

(87) PCT Pub. No.: WO00/19433

PCT Pub. Date: Apr. 6, 2000

(51) Int. Cl.[7] .......................... G11B 23/00; G11B 25/00; G11B 33/14

(52) U.S. Cl. ..................... 369/263; 360/97.02

(58) Field of Search .............. 360/97.01, 97.02; 369/75.1, 263, 258, 176; 361/685; 248/633, 634, 636, 638, 618

(56) References Cited

U.S. PATENT DOCUMENTS

| | | | |
|---|---|---|---|
| 4,713,714 A | * 12/1987 | Gatti et al. | 360/137 |
| 5,004,207 A | * 4/1991 | Ishikawa et al. | 248/632 |
| 5,677,813 A | * 10/1997 | Yoshida et al. | 360/97.02 |
| 5,760,998 A | * 6/1998 | Berberich et al. | 360/97.02 |
| 6,034,841 A | * 3/2000 | Albrecht et al. | 360/97.01 |

FOREIGN PATENT DOCUMENTS

| | | |
|---|---|---|
| JP | 4-31496 | 3/1992 |
| JP | 7-272470 | 10/1996 |

* cited by examiner

*Primary Examiner*—Robert S. Tupper
*Assistant Examiner*—Julie Anne Watko
(74) *Attorney, Agent, or Firm*—Sughrue Mion, PLLC

(57) ABSTRACT

The present invention is provided with a reinforcing base section 5 which is secured to and engages with an independent lateral plate 2, 2 which is formed on a corner section of a chassis 1 and a damper 6 which is integrated with said reinforcing base section 5 and which absorbs vibrations of said disk playing unit. In this way, it is possible to reinforce in a simple way a corner section of a chassis 1 which is formed by progressive die molding. In addition, since the damper section 6 is disposed simultaneously by the fixation of the reinforcing base section 5 to the chassis 1, it is possible to improve the efficiency of the assembly operation at each stage, reduce the number of components and reduce costs.

4 Claims, 13 Drawing Sheets

FIG.20
PRIOR ART

CORNER PART REINFORCING DEVICE OF DISC DEVICE CHASSIS

FIELD OF THE INVENTION

The present invention relates to a corner section reinforcing device for a chassis used for a disk device which reinforces a bent corner section of a chassis used for a disk device and which protects a disk playing unit from exterior vibrations.

PRIOR ART

A disk device which plays an optical disk stores a disk playing unit which mounts a turntable or a pick up so as to be freely movable in the chassis due to a damping member such as a coil spring. This enables protection from any influence on the disk playing unit due to vibration or shocks from the outside coming into contact with the chassis. In particular, a disk device for use in an automobile comprises a damping member due to the fact that it is liable to be in contact with continuous vibrations.

The chassis is provided with a lateral plate which is formed by bending a metal plate and a corner section which is formed by two independent adjacent lateral plates. There is a danger however that lateral plates and corner section of the chassis will undergo deformation due to the independent lateral plates collapsing under a falling shock. In order to prevent such an eventuality, the lateral plates are secured to each other by caulking, and the corner section is reinforced by a transverse plate member on the lateral plate section which is secured by a bolt.

Figure 18:
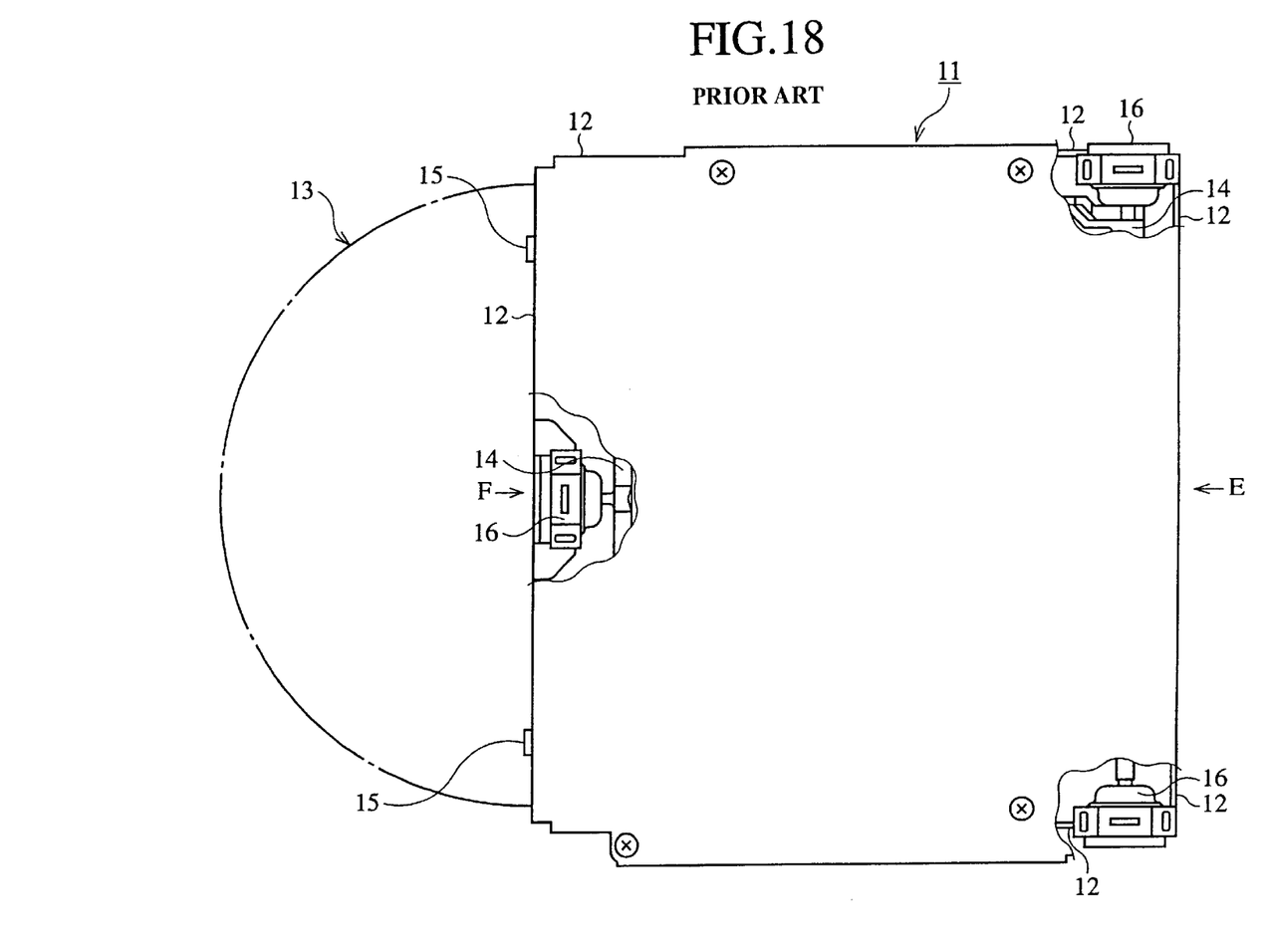
FIG. 18 is a plan view of a chassis of a conventional disk device.
Figure 19:
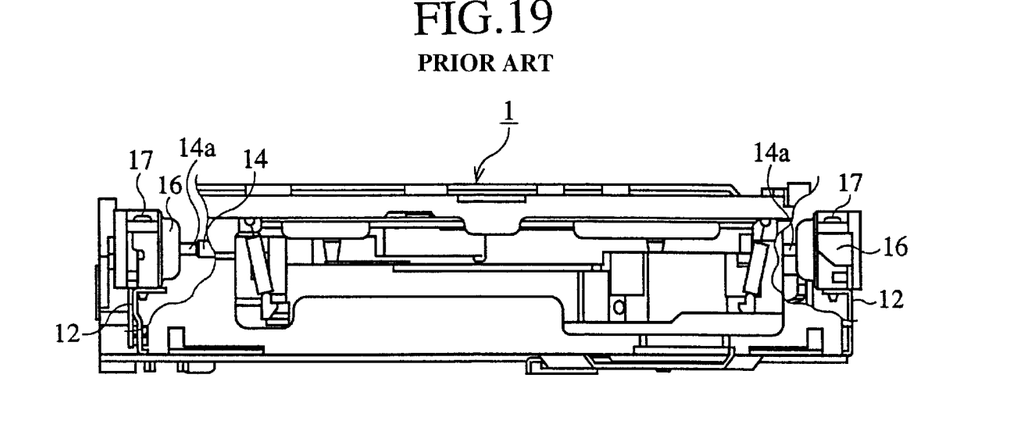
FIG. 19 is a lateral view of a chassis in FIG. 18 as seen from direction E.
Figure 20:
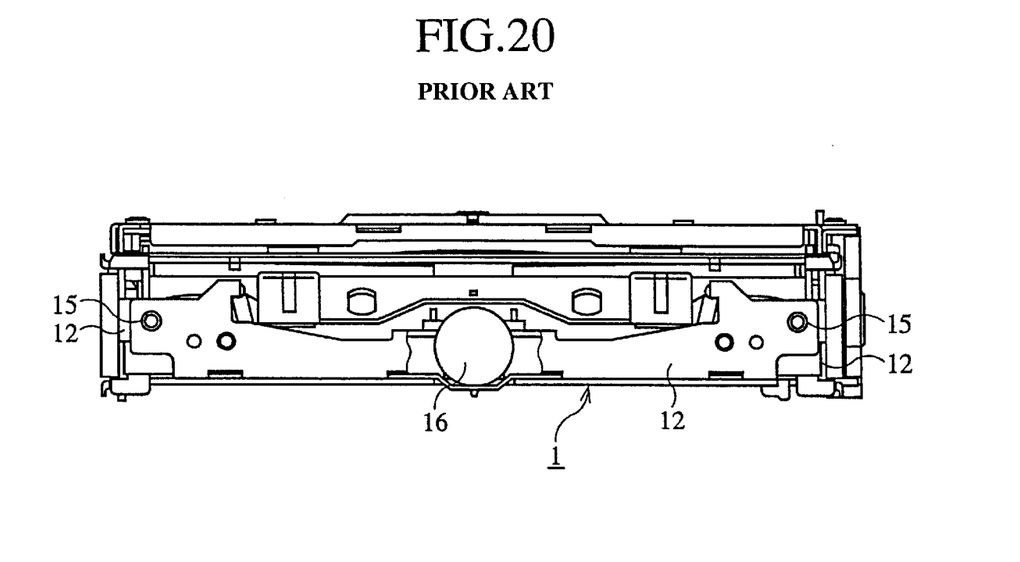
FIG. 20 is a lateral view of the chassis in FIG. 18 as seen from direction F.

FIG. 18 is a plan view of a chassis of a conventional disk device. FIG. 19 is a lateral view of the chassis in FIG. 18 seen from direction E. FIG. 20 is a lateral view of the chassis in FIG. 18 seen from direction F.

In the figures, reference numeral 11 denotes a chassis, 12 is an upright lateral plate which is bent in order to form a lateral face of the chassis 11, 13 is an optical disk, 14 is a disk playing unit which plays optical disks, and which is stored in the chassis so as to freely movable due to a coil spring and a damper. 14a is an engagement pin provided in the disk playing unit 14. 15 is a caulked section to secure the lateral plates 12, 12 to each other which reinforce the corner section of the chassis 11. 16 is a damper which is filled with a viscous liquid and which is disclosed for example in JP-A-7-272470. 17 is a bolt which secures the damper 16 to the lateral plate 12.

The operation of the invention will be explained below.

The corner section of the chassis 11 is reinforced by the caulking section 15.

The disk playing unit 14 displaces relative to the chassis 11 in response to external vibrations coming into contact with the chassis 11. The damper 16 in this sense applies a braking operation on the engaging pin 14a and absorbs external vibration due to the viscosity of the stored viscous liquid and its elastic deformation. Thus the external vibrations are absorbed.

Since such a conventional corner section reinforcing device of a chassis used for a disk device is formed in the above manner, the problem of high costs has arisen due to the fact that the chassis 11 can not be produced with progressive die molding and it is necessary to form a caulked section 15 and reinforce the corner section of the chassis 11.

Furthermore instead of reinforcing the corner section above by securing lateral plates 12, 12 by a caulking section 15, when a transverse plate member is fixed to the lateral plates 12, 12 by a bolt, the problems of increased numbers of components, the addition of another fixing operation and elevated costs have arisen.

The present invention is proposed to solve the above problems and has the object of providing a corner section reinforcing device for a chassis used for a disk device which can easily reinforce the corner section of a chassis which is produced by progressive die molding and which is produced at a low cost.

DISCLOSURE OF THE INVENTION

The present invention is provided with a reinforcing base section which is fixed to and engages with two independent lateral plates formed on the corner section of a chassis and which reinforces a corner section, and a damping section which is provided on said reinforcing base section and which absorbs the vibrations of a disk playing unit.

In this way, the corner section of a chassis, which is produced by progressive die molding, is simply reinforced by a reinforcing base section. In addition, since a damping section is simultaneously disposed by fixing the reinforcing base section to the chassis, it is possible to greatly reduce the number of components and improve the efficiency of the assembly procedure at all stages as well as reduce costs.

The present invention is provided with an engagement hole into which is inserted an engaging piece which is formed on a lateral plate of the chassis.

In this way, it is possible for the engaging piece of the chassis and the reinforcing base section to engage easily.

The engaging hole of the reinforcing base section of the present invention is provided with a projection which engages with the engaging hole which is formed on the engaging piece of the independent lateral plates.

In this way, it is possible for the engaging piece of the chassis and the reinforcing base section to easily and strongly engage.

The reinforcing base section and the damper section of the present invention are formed by double layer molding.

In this way, it is possible to integrate the different materials of the reinforcing base section, which is formed from hard material, with the damper section, which is formed by soft material. As a result, it is possible to manufacture the device by mass-production and to reduce costs.

DESCRIPTION OF THE PREFERRED EMBODIMENTS

The preferred embodiments of the present invention will be explained below making reference to the accompanying drawings in order to explain the invention more fully.

Embodiment 1

Figure 1:
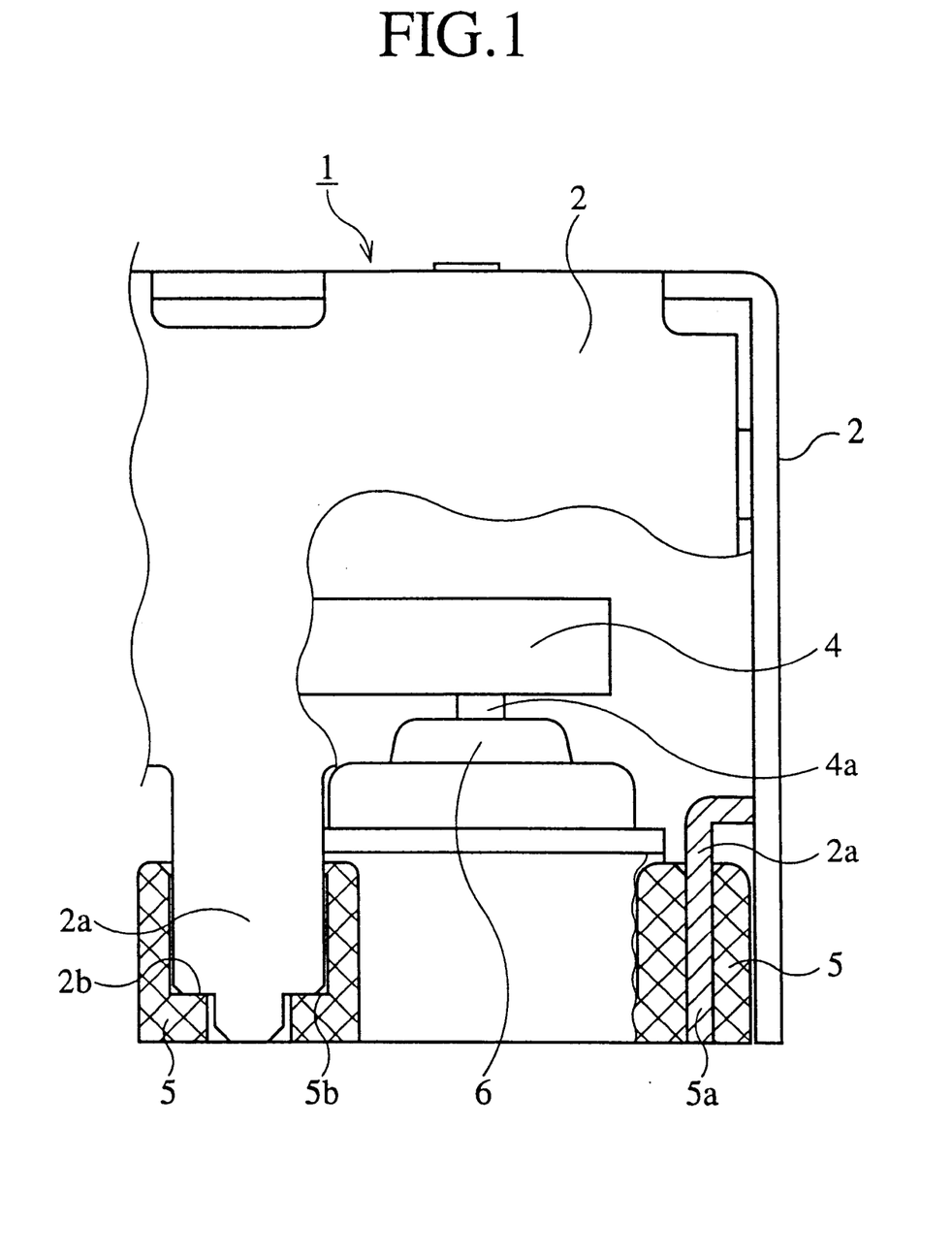
FIG. 1 is a partial cross section showing the engaging position of the chassis and the reinforcing base section of the corner section reinforcing device for a chassis used for a disk device according to a first embodiment of the present invention.
Figure 2:
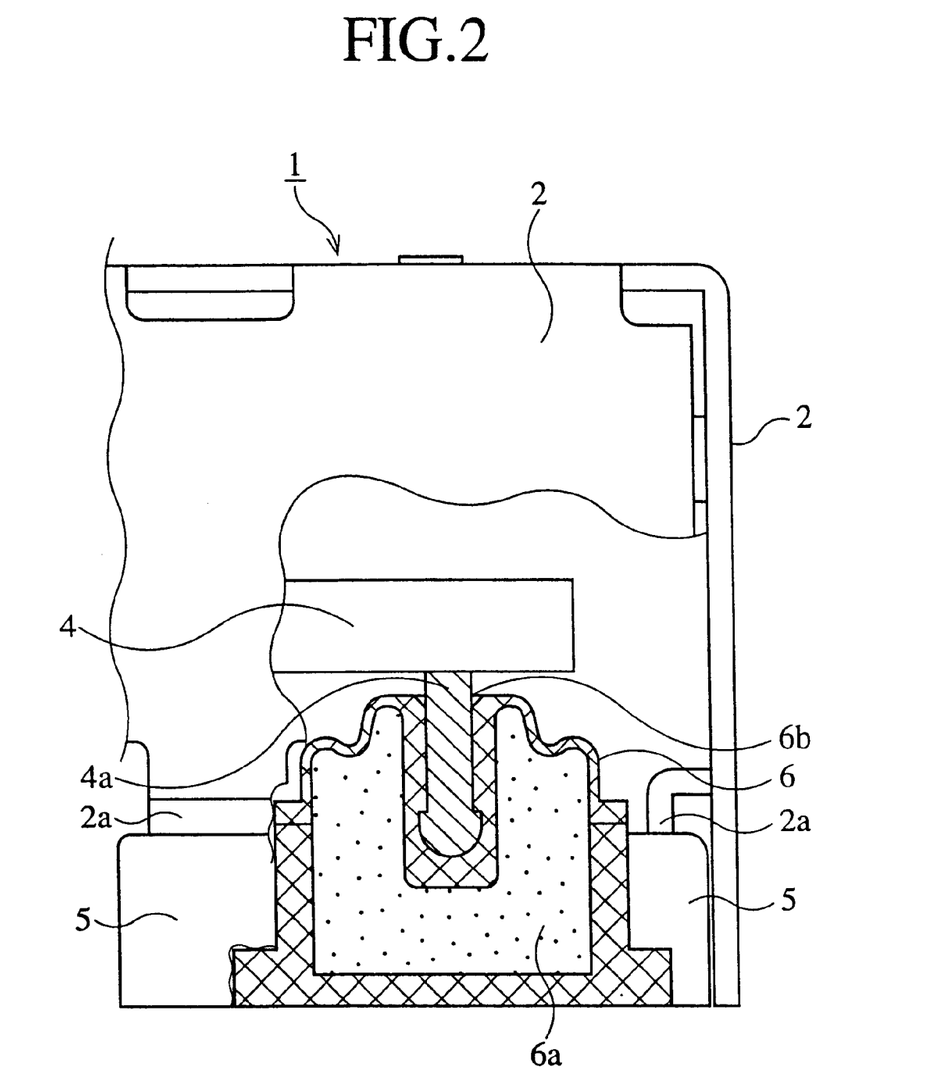
FIG. 2 is a partial cross section showing the engaging position of the damper section and the disk playing unit.
Figure 3:
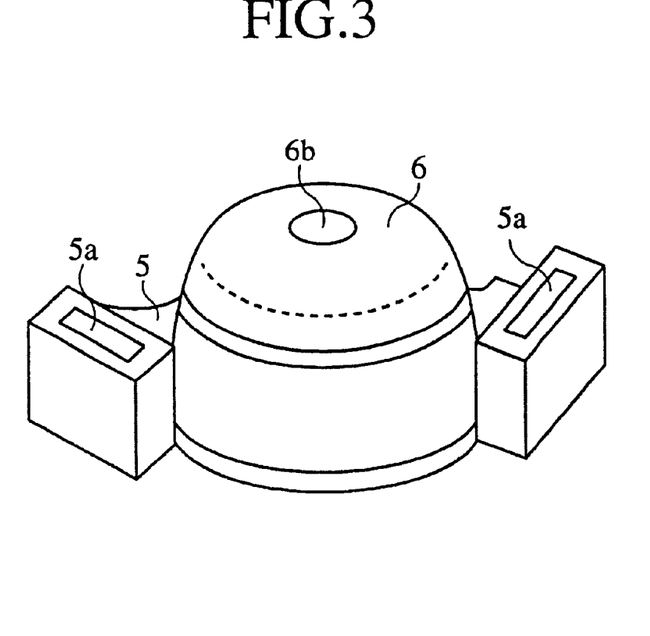
FIG. 3 is a front perspective view of the corner section reinforcing device of a chassis used for a disk device.
Figure 4:
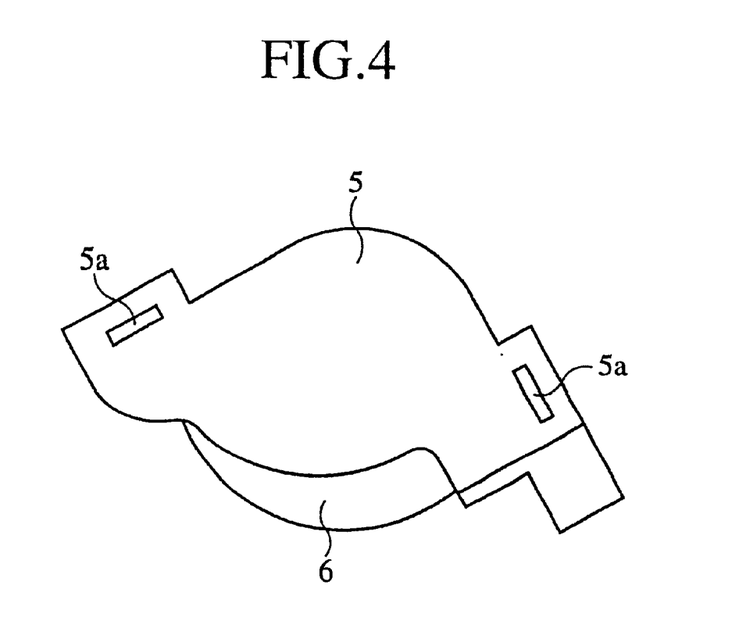
FIG. 4 is a rear perspective view of the corner section reinforcing device of a chassis used for a disk device.
Figure 5:
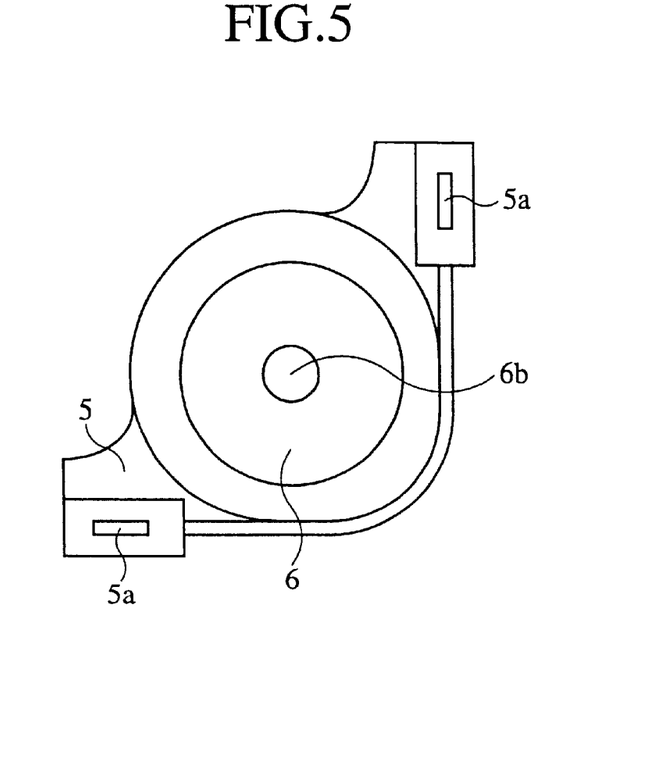
FIG. 5 is a plan view of a corner section reinforcing device of a chassis used for a disk device.
Figure 6:
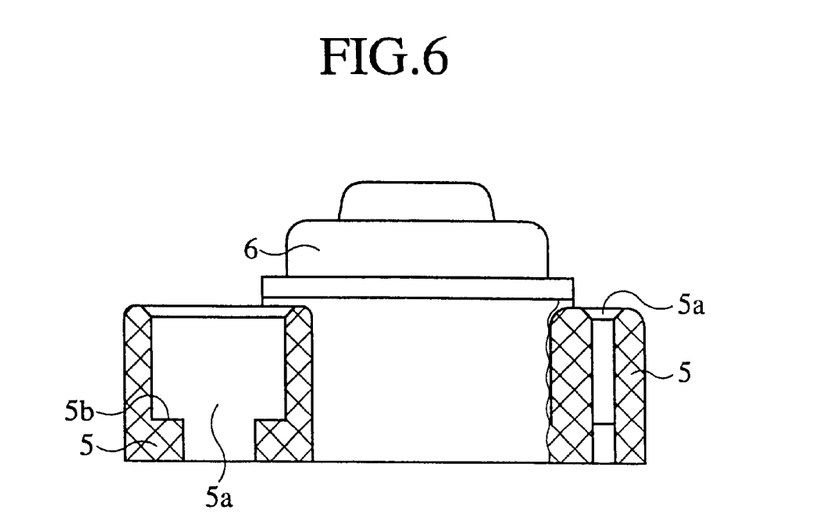
FIG. 6 is a partial cross section of a reinforcing base section.
Figure 7:
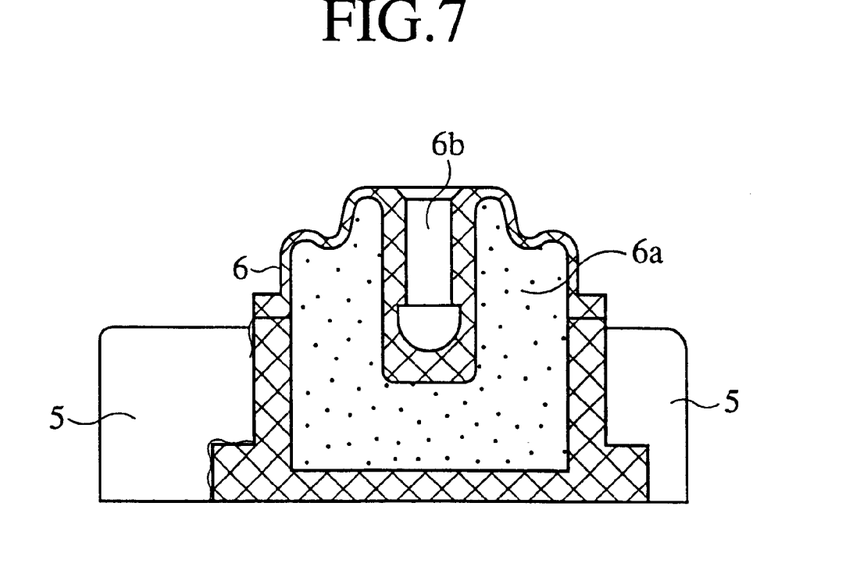
FIG. 7 is a partial cross section of a damper section.
Figure 8:
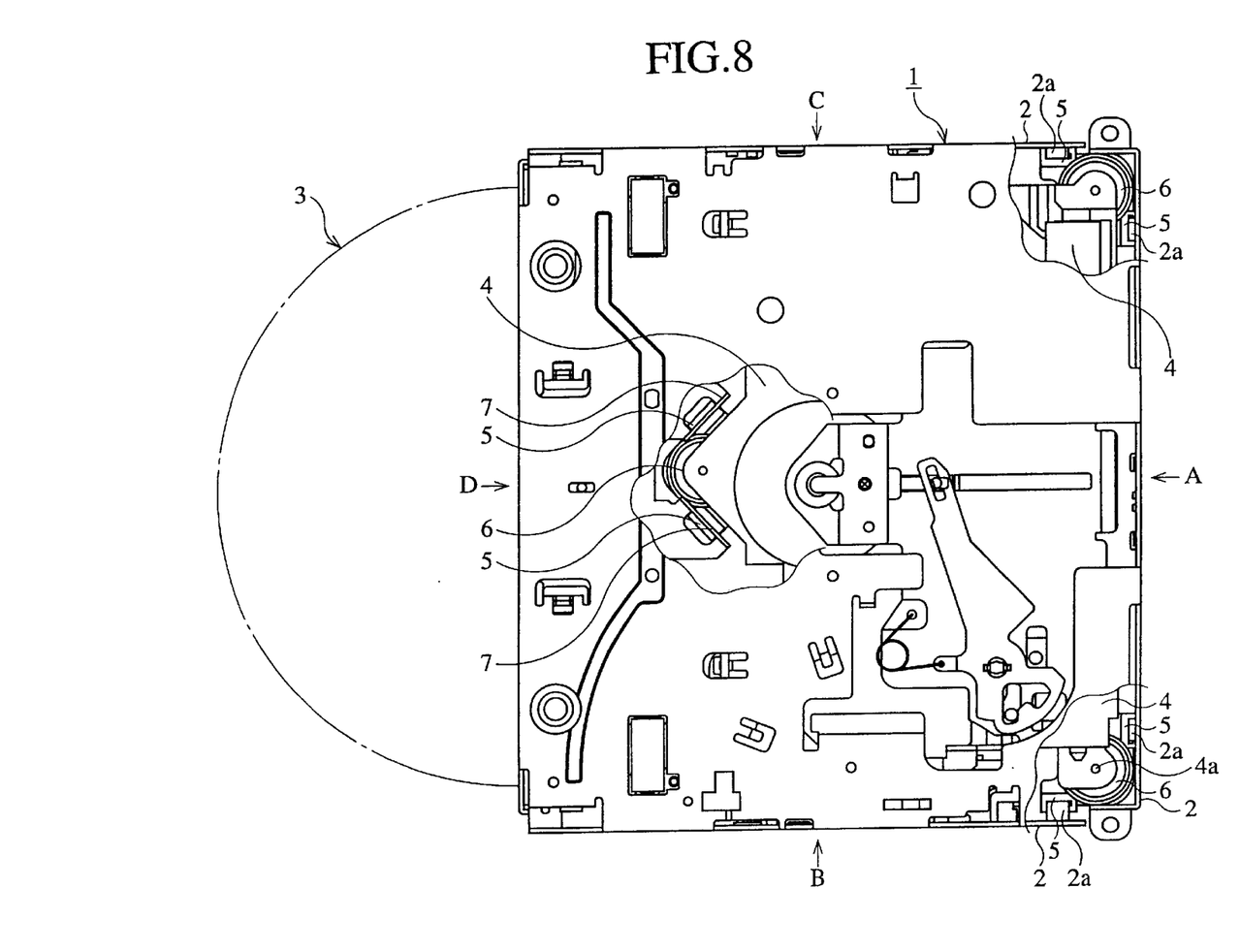
FIG. 8 is a plan view of a chassis of a disk device.
Figure 9:
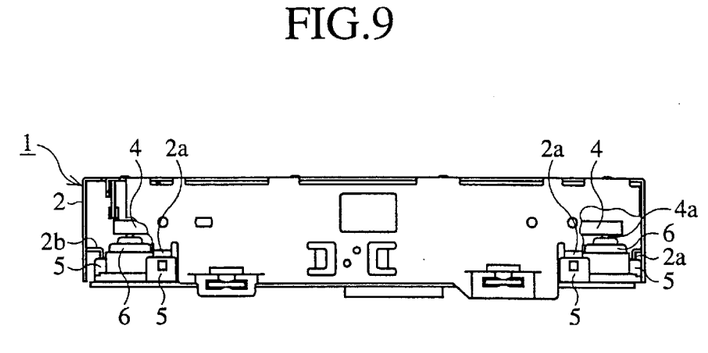
FIG. 9 is a lateral view of a chassis in FIG. 8 as seen from direction A.
Figure 10:
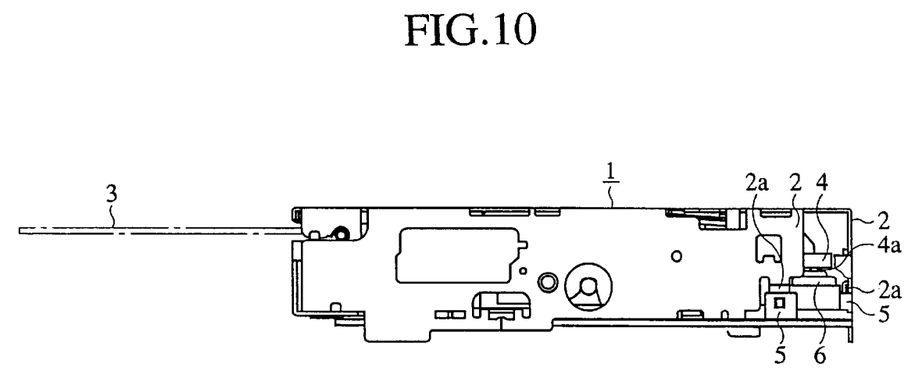
FIG. 10 is a lateral view of the chassis in FIG. 8 as seen from direction B.
Figure 11:
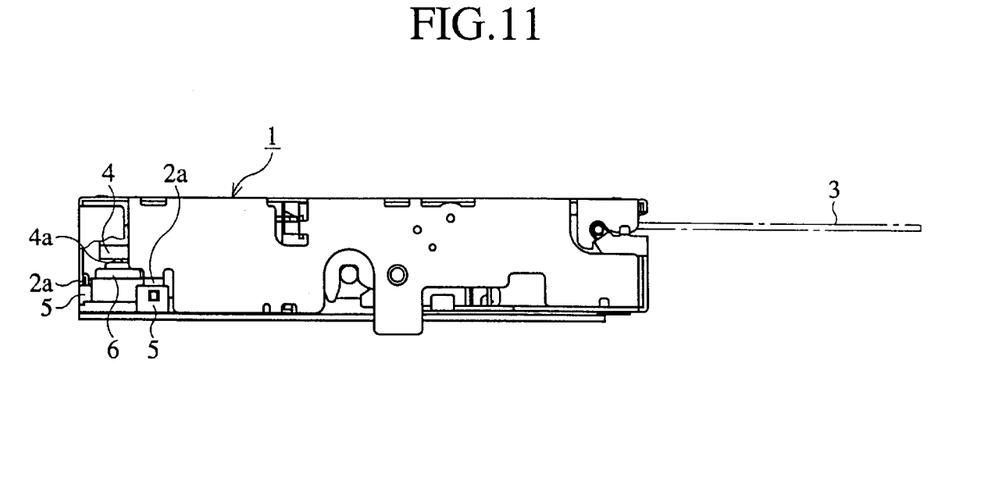
FIG. 11 is a lateral view of the chassis in FIG. 8 as seen from direction C.
Figure 12:
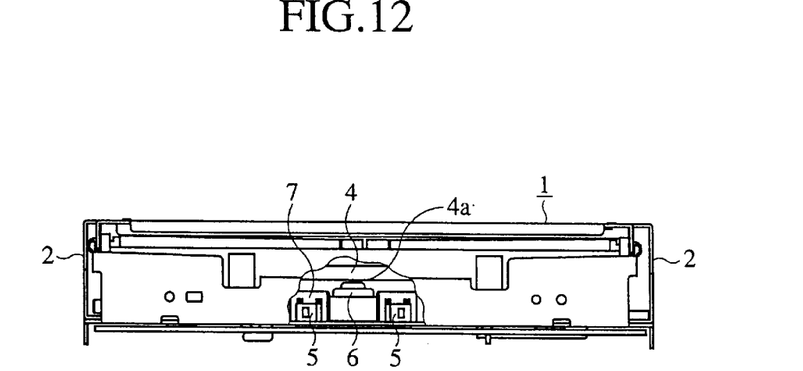
FIG. 12 is a lateral view of the chassis in FIG. 8 as seen from direction D.

FIG. 1 is a partial cross section showing the engaging position of the chassis and the reinforcing section of the corner section reinforcing device for a chassis used for a disk device according to a first embodiment of the present invention. FIG. 2 is a partial cross section showing the engaging position of the damper section and the disk playing unit. FIG. 3 is a front perspective view of the corner section reinforcing device of a chassis used for a disk device. FIG. 4 is a rear perspective view of the corner section reinforcing device of a chassis used for a disk device. FIG. 5 is a plan view of a corner section reinforcing device of a chassis used for a disk device. FIG. 6 is a partial cross section of a reinforcing base section. FIG. 7 is a partial cross section of a damper section. FIG. 8 is a plan view of a chassis of a disk device. FIG. 9 is a lateral view of a chassis in FIG. 8 as seen from direction A. FIG. 10 is a lateral view of the chassis in FIG. 8 as seen from direction B. FIG. 11 is a lateral view of the chassis in FIG. 8 as seen from direction C. FIG. 12 is a lateral view of the chassis in FIG. 8 as seen from direction D.

In the figures, reference numeral 1 refers to a chassis which is manufactured by progressive die molding, 2 are independent lateral plates which are formed by bending in order to form a lateral face of the chassis 1, 2a is an engaging piece which is formed on the independent lateral plates 2, 2b is a step which is formed on the tip of the engaging piece 2a, 3 is an optical disk, 4 is a disk playing unit which mounts a turn table or a pickup or the like (not shown) in order to play the optical disk and which is stored so as to be freely displaceable in the chassis due to a coil spring (not shown). 4a is an engaging pin provided on the disk playing unit.

5 is a reinforcing base section which is fixed to and engages with the engaging piece 2a of the independent lateral plate 2 and which reinforces the corner section formed by the lateral plates 2, 2. For example the reinforcing base section 5 may be formed by hard resin. 5a is an engaging hole which is formed so that an engaging piece 2a may be inserted therein. 5b is a step which engages with the step 2b of the engaging piece 2a.

6 is a damper section which absorbs the vibrations of the disk playing unit and which may be integrated with the above mentioned reinforcing base section 5 by being formed by double layer molding. The damper section 6, as shown in FIGS. 2 and 7, is formed in a closed tubular shape by a flexible material such as a butyl-type rubber. A viscous fluid 6a such as silicon oil fills the interior. 6b is an engaging indentation which engages with the engaging pin of the disk playing unit 4.

In FIGS. 8 and 12, 7 is an engaging piece which forms a part of the mounting metal plate of the damper and which is insertable into the engaging hole 5a of the reinforcing base section 5.

As shown above, a corner section reinforcing device for a chassis used for a disk device as formed from a reinforcing base section 5 and a damper section 6 and is disposed adjacent to the center of the chassis 1 with corner sections at two positions which are formed by independent lateral plates 2, 2 as shown in FIG. 8.

The operation of the invention will be explained below.

When the engaging piece 2a of each independent lateral plate 2 engages with the engaging hole 5a of the reinforcing base section 5, both independent lateral plates 2 are connected by the reinforcing base section 5. Also the relative movement of the independent lateral plates 2 is limited by the reinforcing base section 5. Thus the reinforcement of the corner section is simplified.

Furthermore since a step 2b is provided on the engaging piece 2a and a step 5b is provided on the engaging hole 5a, it is possible to limit movement during insertion and determine the position of the reinforcing base section 5 easily.

The position of the damper 6 is simultaneously determined by the disposition of the reinforcing base section 5 to the position above. Since a screw member to secure the damper section is unnecessary in contradistinction to the conventional example, it is possible to reduce the number of components and greatly reduce required time and labor.

The disk playing unit 4 receives external vibrations which come into contact with the chassis 1 and displaces relative to the chassis 1. At such times, the damper 6 applies a braking force to the engaging pin 4a due to the viscosity of the viscous liquid 6a and its elastic deformation and thus absorbs external vibrations. Therefore the damper 6 returns to its original position due to an elastic return force after the braking operation.

As shown above, according to embodiment 1, the reinforcement of a corner section of a chassis which is formed by progressive die molding is simply enabled by a reinforcing base section 5. A damper 6 may be simultaneously disposed by the fixation of the reinforcing base section 5 to the chassis 1. Thus the efficiency of the assembly operation is improved at all stages, the number of components used is greatly reduced and costs are reduced.

Furthermore since the reinforcing base section 5 and the damper section 6 are formed by double layer molding, it is possible to simply integrate the two although they are formed from different materials, to mass produce the device and to reduce manufacturing costs.

In embodiment 1 above, the invention was explained as applied to a disk device. The invention is however not limited in this respect and may obtain the same effect by being applied to various devices which require protection from vibration and reinforcement of a corner section of a chassis.

Embodiment 2

Figure 13:
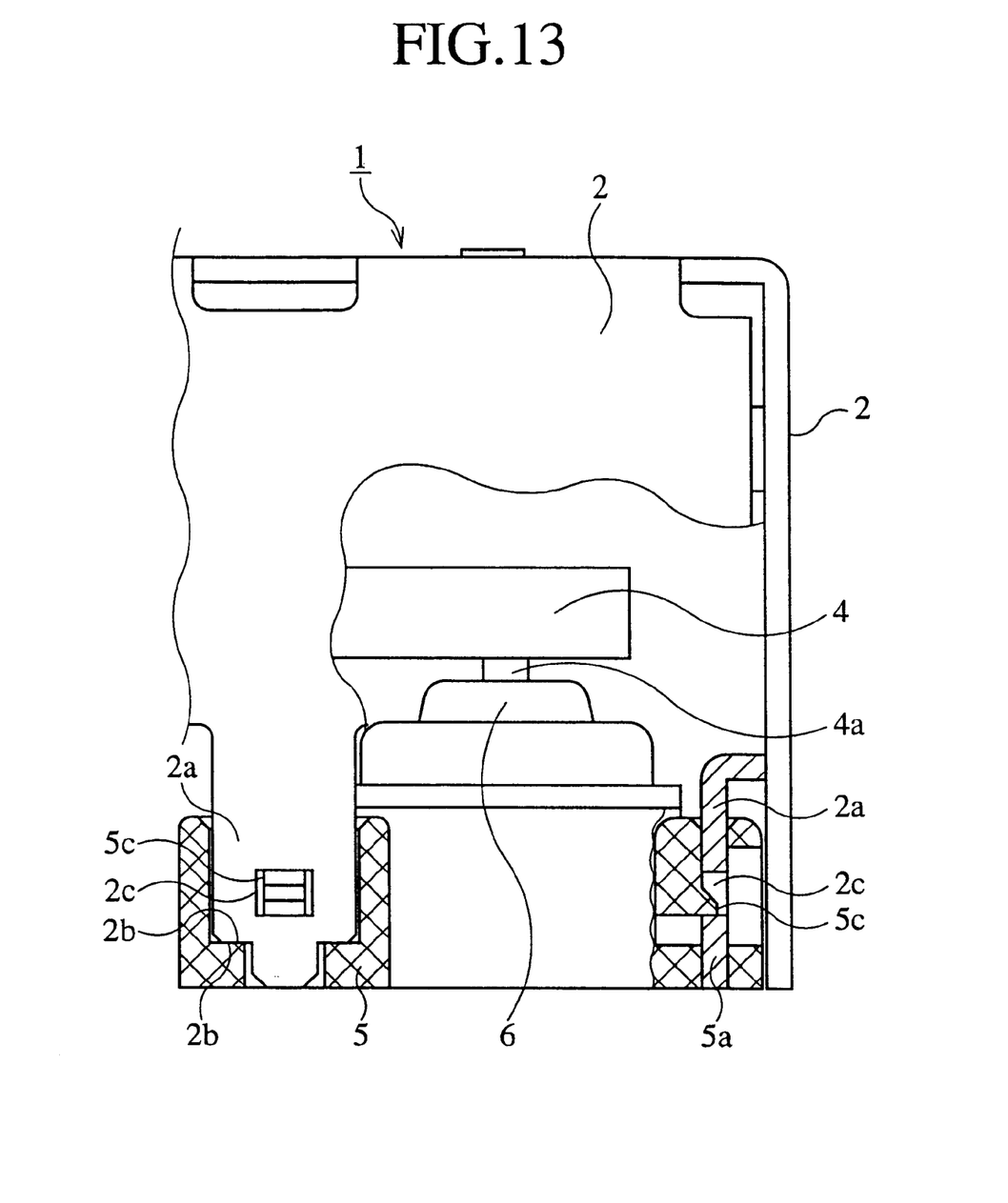
FIG. 13 is a partial cross section showing the engaging position of the chassis and the reinforcing base section of a corner section reinforcing device for a chassis used for a disk device according to a second embodiment of the present invention.
Figure 14:
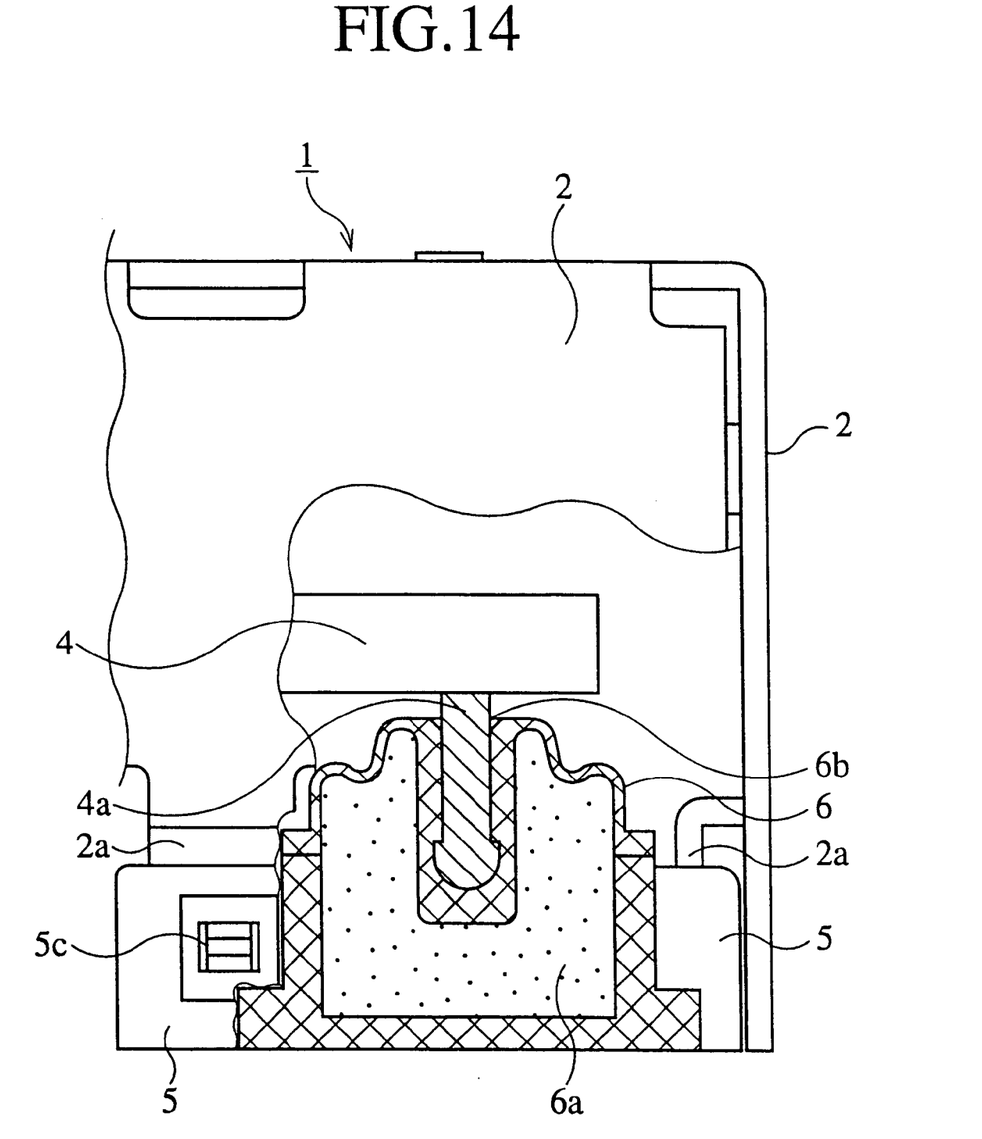
FIG. 14 is a partial cross section of the engaging position of a damper section and a disk playing unit.
Figure 15:
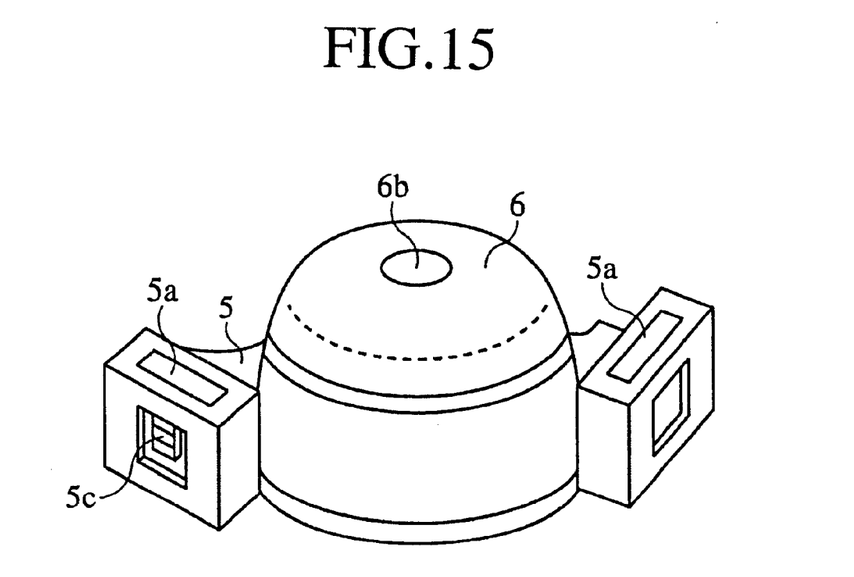
FIG. 15 is a front perspective view of a corner section reinforcing device for a chassis used for a disk device.
Figure 16:
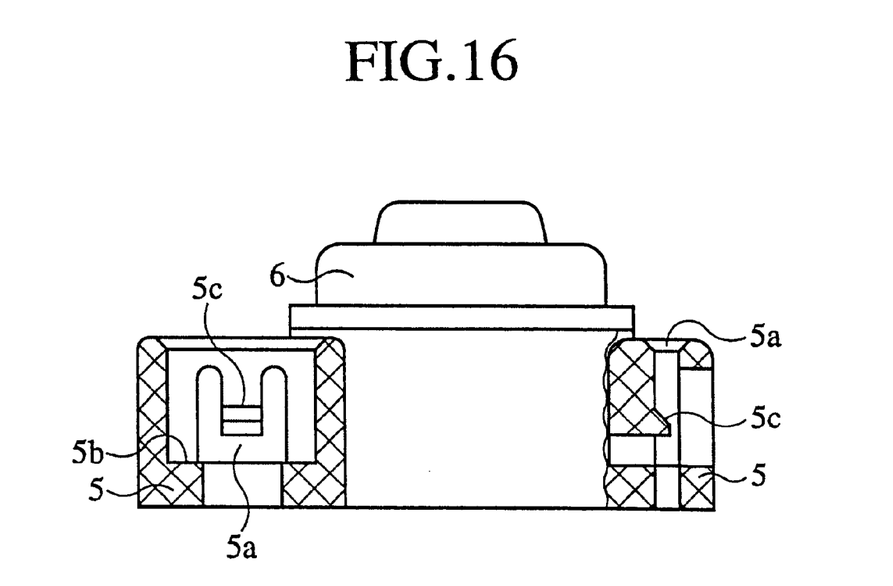
FIG. 16 is a partial cross section of a reinforcing base section.
Figure 17:
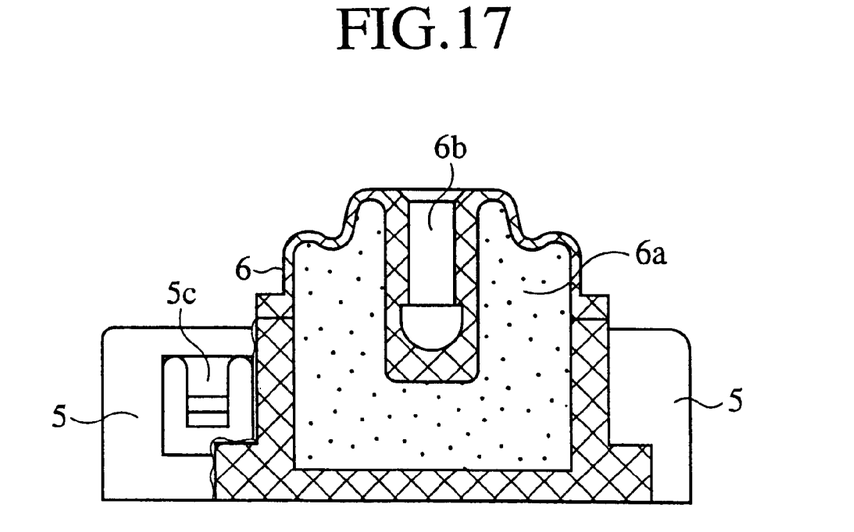
FIG. 17 is a partial cross section of a damper section.

FIG. 13 is a partial cross section of a reinforcing base section engaging with a chassis of a corner section reinforcing device for a chassis used for a disk device according to a second embodiment of the present invention. FIG. 14 is a partial cross section of the engaging position of a damper section and a disk playing unit. FIG. 15 is a front perspective view of a corner section reinforcing device for a chassis used for a disk device. FIG. 16 is a partial cross section of a reinforcing base section. FIG. 17 is a partial cross section of a damper section. In the discussion below, components which have already been explained are designated by the same reference numerals and will not be explained again.

In the figures, 2c is an engaging hole which is provided in the engaging piece 2a. 5c is a projection which is provided in the engaging hole 5a so as to engage with the engaging hole 2c.

The operation of the invention will be explained below.

Since the projection 5c engages with the engaging hole 2c when the engaging piece 2a of each independent lateral plate 2 is inserted into the engaging hole 5a of the reinforcing base section 5a, the reinforcing base section 5 and the engaging piece 2a are simply and strongly secured. In addition, the reinforcing base section 5 is prevented from detaching from the engaging piece 2a. Other operations are the same as in embodiment 1 above and will not be explained again.

As shown above, the present invention according to embodiment 2 apart from obtaining the same effect as embodiment 1 also prevents the detachment of the reinforcing base section 5 from the engaging piece 2a.

Industrial Applicability

As shown above, a corner section reinforcing device for a chassis used for a disk device according to the present invention may be applied to a disk device in order to simply and cheaply reinforce the corner section of a chassis which is formed by progressive die molding.

What is claimed is:

1. A corner section reinforcing device for a chassis used for a disk device comprising
   a reinforcing base section which is fixed to and engages with two independent lateral plates, wherein said independent lateral plates form a corner section of said chassis, and said reinforcing base section reinforces said corner section, and
   a damper section which is provided in said reinforcing base section, which abuts with a part of a disk playing unit which is stored so as to be freely movable in said chassis and which absorbs vibrations of said disk playing unit.

2. A corner section reinforcing device for a chassis used for a disk device according to claim 1, wherein said reinforcing section is provided with an engaging hole into which an engagement piece, which is formed on one of said independent lateral plates of said chassis, is inserted.

3. A corner section reinforcing device for a chassis used for a disk device according to claim 1, wherein an engagement hole of said reinforcing base section is provided with a projection which engages with an engagement hole formed on an engagement piece of one of said independent lateral plates.

4. A corner section reinforcing device for a chassis used for a disk device according to claim 1, wherein said reinforcing base section and said damper are formed by double molding.

* * * * *